United States Patent [19]
Trautner et al.

[11] 4,106,069
[45] Aug. 8, 1978

[54] PROTECTION ARRANGEMENT FOR A BRUSHLESS SYNCHRONOUS MACHINE

[75] Inventors: Jürgen Trautner, Erlangen; Peter Kolbe, Nüremberg, both of Fed. Rep. of Germany

[73] Assignee: Siemens Aktiengesellschaft, Munich, Fed. Rep. of Germany

[21] Appl. No.: 795,875

[22] Filed: May 11, 1977

[30] Foreign Application Priority Data

May 19, 1976 [DE] Fed. Rep. of Germany ....... 2622309

[51] Int. Cl.² .............................................. H02H 7/08
[52] U.S. Cl. ..................................... 361/30; 318/181; 361/79; 322/68; 322/25
[58] Field of Search ................ 361/30, 33, 20, 21, 361/23, 79, 86, 56; 322/22, 23, 24, 25, 28, 68, 72, 73, 99; 318/181, 183

[56] References Cited

U.S. PATENT DOCUMENTS

| 3,539,906 | 11/1970 | Habock | 322/68 X |
| 3,548,287 | 12/1970 | Blaschke et al. | 322/25 X |
| 3,564,391 | 2/1971 | Dinger | 322/25 |
| 3,748,555 | 7/1973 | Hoffman | 318/181 |

*Primary Examiner*—Patrick R. Salce
*Attorney, Agent, or Firm*—Kenyon & Kenyon, Reilly, Carr & Chapin

[57] ABSTRACT

In a protective arrangement for protecting a brushless synchronous machine against overvoltage at a field winding which is connected to a rotating excitation rectifier which is fed from an exciter machine, in which the field winding is short circuited by means of a solid state switching element when overvoltages occur, a voltage comparison means is provided to which are fed as respective first and second inputs, a first input voltage proportional to the primary voltage of the exciter machine and a second input voltage proportional to the primary current of the exciter machine with the proportionality constant chosen such that for normal operation of the synchronous machine the absolute value of the second input voltage is lower than the first input voltage and for operation when the field winding is short circuited, the absolute value of the second input voltage is greater than the first input voltage.

12 Claims, 4 Drawing Figures

PROTECTION ARRANGEMENT FOR A BRUSHLESS SYNCHRONOUS MACHINE

BACKGROUND OF THE INVENTION

This invention relates to brushless synchronous machines in general and more particularly to an improved protection arrangement for protecting a brushless synchronous machine against overvoltages at the field winding which is connected to a rotating excitation rectifier which is fed from an exciter machine, where the field winding can be short circuited by means of a solid state switching element in the event of overvoltages.

As a rule, the protection arrangement for protecting against overvoltages in a brushless synchronous machine consists of a solid state switching element, particularly a thyristor, which is shunted across the field winding and which can be closed automatically by a voltage monitoring device, which is equipped, in particular, with Zener diodes or other threshold components. A resistor is sometimes arranged in series with the switching element. The secondary winding of the exciter machine, the excitation rectifier, the switching element, the resistor, if applicable, and the voltage monitoring circuit are mounted on the rotor of the synchronous machine. Therefore, when the machine is operating they corotate with the rotor and the field winding. As soon as the output voltage of the excitation rectifier exceeds a given, permanently set value due to a disturbance, the excitation rectifier is short circuited on the output side by the protection arrangement. Since thereupon field current is no longer supplied to the field winding, the synchronous machine can no longer deliver torque even though the armature current still flows. The synchronous machine and, therefore, also the driven processing machine are shut down.

As already mentioned, the occurrence of overvoltages in the rotating part of the synchronous machine is detected automatically. Likewise, the initiation of the short circuit at the field winding is automatic. An indicating signal which indicates an overvoltage or the short circuit, is not available outside the rotating part of the synchronous machine. Such an indicating signal is desired at the outside, however, if switching actions are to be initiated because of the disturbance, for instance, if the armature current of the synchronous machine or the primary current of the exciter machine is to be switched off. Such an indicating signal, however, is also desirable if the disturbance is to be indicated visually or acoustically.

SUMMARY OF THE INVENTION

It is an object of the present invention to design a protection arrangement such as that mentioned above at small cost and in such a manner that a corresponding indication signal is available outside the rotating part of the synchronous machine when the protection arrangement responds.

According to the present invention, this problem is solved by providing voltage comparison means, to which are fed, at respective first and second inputs, a first input voltage proportional to the primary voltage of the exciter machine and a second input voltage proportional to the primary current of the exciter machine. The two voltages are fed by means developing proportionality constants which are chosen such that, for normal operation of the synchronous machine, the absolute value of the second input voltage is lower than the first input voltage and, for operating when the field winding is short circuited, the absolute value of the second input voltage is above the first input voltage. An indicating signal is then taken off at the output of the voltage comparison means.

It is therefore possible by means of the two input voltages and the voltage comparison means, to ascertain that the protection arrangement for protecting against overvoltages, built into the rotor of the brushless synchronous machine, has responded. For this purpose, only the primary voltage and the primary current of the exciter machine need to be measured. Both quantities are available outside the rotating part of the synchronous machine either as measured values or as desired values. It is therefore possible to generate an indicating signal for the response of the protection arrangement without a conductive connection, for instance, via brushes, or a wireless connection between the rotating part and the stationary part of the synchronous machine being necessary. It is therefore a particularly advantageous property of the protection arrangement according to the present invention that it can be implemented with electrical quantities which can be picked up outside the rotating part of the synchronous machine and can therefore be measured in a particularly simple manner.

For forming the first input voltage for the voltage comparison means, a measuring device which comprises a transformer having its primary connected to the primary winding of the exciter winding, and having a first rectifier connected to its secondary. The first proportionality constant can be set by means the step down ratio of the transformer. However, if a control element which feeds the primary winding of the exciter machine, and which can be controlled with a control signal is available, then the transformer and the first rectifier are not necessary. For, it is possible to use the control signal of the control element directly as the first input signal.

For forming the second input voltage for the voltage comparison means, a measuring device which comprises a current transformer having its primary connected in series with the primary winding of the exciter machine, and having a second rectifier in its secondary can be provided. The second proportionality constant can be set by means of the number of turns. If the exciter machine has a three phase primary winding, then the measuring device can comprise three current transformers, each of which is arranged in a lead to the primary winding, with a rectifier with valves, particularly semiconductor diodes, which are Y-connected in a bridge circuit at the secondaries of the current transformers.

One or more current transformers can be eliminated if a control element is provided which feeds the primary winding of the exciter machine and which can be controlled by a control signal which is in turn supplied by a current regulator, to which an actual current value and a reference current value are fed, since then the reference current value or the actual current value of the current regulator can be provided as the second input voltage. In the latter case, the actual current value of the current control loop can be used over again, which is available anyhow.

As a voltage comparison member, an operational amplifier, in particular, may be provided.

DETAILED DESCRIPTION OF THE INVENTION

Figure 1:
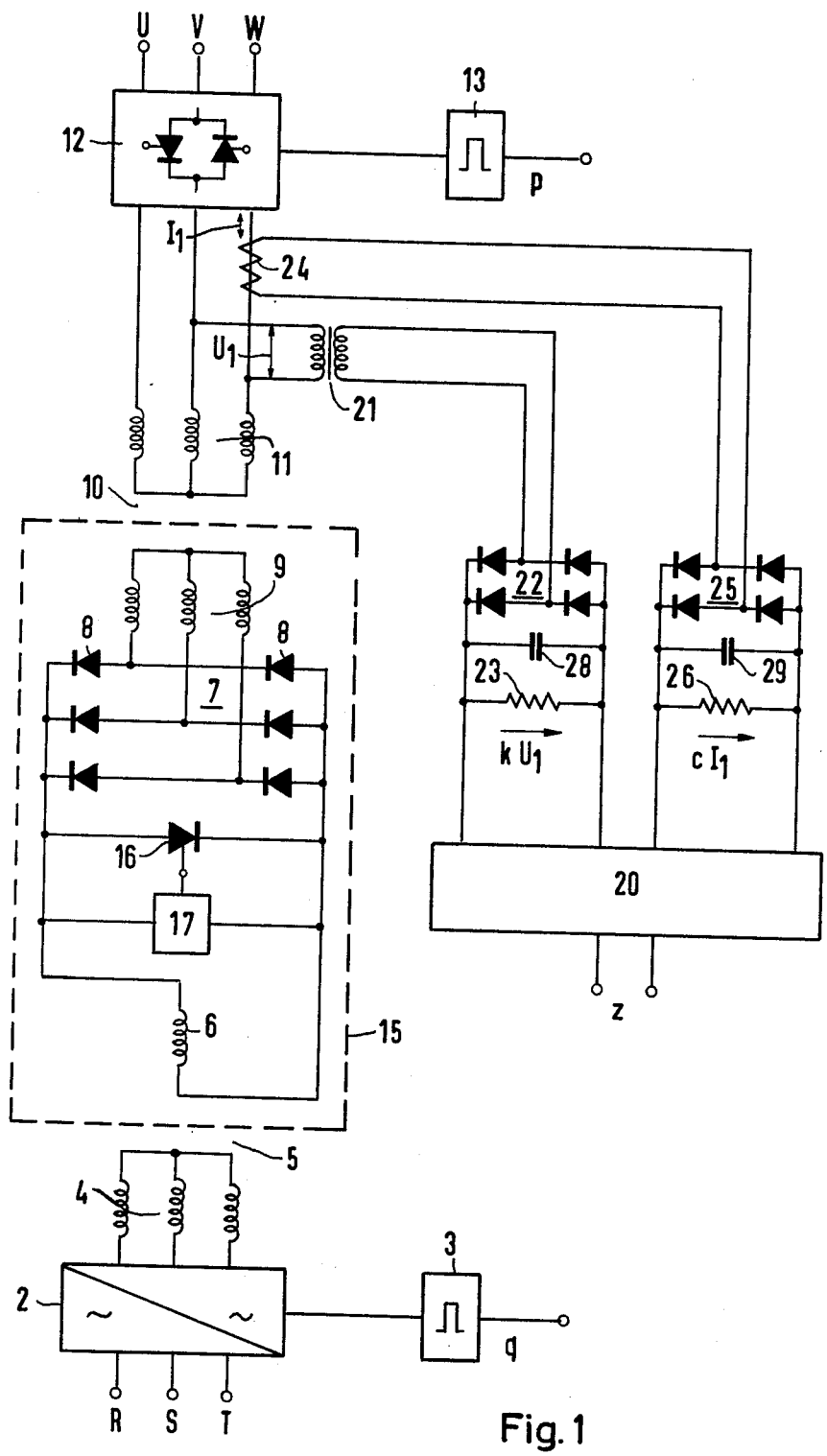
FIG. 1 is a schematic diagram of a protection arrangement according to the present invention for a brushless synchronous machine, in which the voltage comparison member is fed from measuring devices for the primary voltage and the primary current, respectively.

According to FIG. 1, a frequency changer 2 has it input connected to a three phase network with the phase conductors R, S, T. The firing pulses for the frequency changer 2 are supplied by a control unit 3 in accordance with a control signal q. The stator winding 4 of a brushless synchronous machine 5 is connected to the output of the frequency changer 2. The rotating field winding of the synchronous machine 5 is designated the reference numeral 6. The field winding 6 is connected via an exciter rectifier 7, having uncontrolled valves 8 in a three phase bridge circuit, to the three phase secondary winding 9 of an exciter machine 10. A three phase primary winding 11 of the exciter machine 10 is fed via a control element 12 from a three phase network with the phase conductors U, V, W. In particular, a three phase control element which is equipped with thyristors as the control element 12 can be provided. The control element 12 is supplied with control pulses by a control unit 13. The control unit 13, in turn, is acted upon by a control signal p. This control signal p can be supplied by a current regulator, not shown, to the comparator, i.e., summing input, of which an actual current value and a reference current value are fed. Such a current regulator loop can advantageously be provided for controlling the primary current $I_1$ of the exciter machine 10. All parts which rotate are shown within dotted block 15. Within this rotating portion 15, in addition to the components 6 to 9, a protection arrangement for protecting against overvoltages at the field winding 6 is also provided. This protection arrangement comprises a controlled solid state switching element 16, which is shunted across the field winding 6, and a voltage monitoring circuit 17. In particular, a thyristor or a series circuit of thyristors can be used, for element 16. If the voltage at the field winding 6 has exceeded a fixed, set value, the voltage monitoring circuit 17 automatically gives a switching command to the switching element 16, whereby the switching element 16 is closed and the excitation rectifier 7 is short circuited. The voltage monitoring circuit 17 is designed in the usual manner, e.g., in accordance with U.S. Pat. No. 3,539,906. It may contain, in particular, Zener diodes or other voltage sensitive components. If an overvoltage occurs at the field winding 6, the latter is therefore short circuited by means of the solid state switching element 16, so that the excitation rectifier 7 can no longer supply excitation current to it. As a consequence, the synchronous machine 5 can no longer deliver torque. It is shut down.

The protection arrangement including elements 16 and 17 shown is further designed so that, when it responds, a corresponding indicating signal z is available outside the rotating part 15 of the synchronous machine 5. To this end, voltage comparison means 20 are provided, which compare a first input voltage $kU_1$ applied to its first input with a second input voltage $cI_1$ applied to its second input. The indicating signal z indicates which of the two input voltages $kU_1$ or $cI_1$ is the larger.

The first input voltage $kU_1$ is proportional to the primary voltage $U_1$ of the exciter machine 10. The proportionality constant is designated k. The second input voltage $cI_1$ is proportional to the primary current $I_1$ of the exciter machine 10. The second proportionality constant is designated c. The two proportionality constants k and c are chosen and are matched to each other in such a way that the absolute value of the second input voltage $cI_1$, in the undisturbed, normal operation of the synchronous machine 5, is lower and, when the field winding 6 is short circuited, higher than the first input voltage $kU_1$. This part of the operation will be explained in more detail when discussing FIG. 2 below.

A measuring device, in the form of a transformer 21 is provided, for forming the first input voltage $kU_1$. The primary winding of transformer 21 is connected between two leads to the primary winding 11 of the exciter machine 10. The primary voltage $U_1$ is therefore applied to the primary winding of the transformer 21. The secondary winding of the transformer 21 is connected to a first rectifier 22. The latter consists of four diodes in a bridge circuit. At its output, across which a load resistor 23 and a smoothing capacitor 28 are connected as a load, the first input voltage $kU_1$ for the voltage comparison means 20 is taken off. The step down ratio of the transformer 21 determines, besides the voltage drops, the magnitude of the first proportionality constant k. If a customary semiconductor operational amplifier is used in the voltage comparison means 20, the step down ratio, in particular, is chosen so that the first input voltage $kU_1$ can assume a maximum value of 15 V.

Deviating from the presentation of FIG. 1, one can also proceed in such a manner that the control signal p of the control element 12 is used as the first input voltage $kU_1$ of the voltage comparison member 20. Thereby, the components 21, 22 and 23 can be saved.

For forming the second input voltage $cI_1$ of the voltage comparison member 20 a measuring device is likewise provided. The latter comprises a current transformer 24, which is arranged in one lead to the primary winding 11, with a second rectifier 25 following it. At the output of the second rectifier 15, to which a smoothing capacitor 29 and as the load, a load resistor 26 are connected, the second input voltage $cI_1$ is taken off. The proportionality constant c is essentially determined by the choice of the number of turns of the current transformer 24.

In deviation from the presentation in FIG. 1, the measuring device for determining the second input voltage $cI_1$ can also comprise three current transformers, one arranged in each lead to the primary winding of the exciter machine 10. These current transformers will be Y-connected on the secondary side, and followed by a recitifer with valves in a three phase bridge circuit, to the output of which a load resistor is connected.

Deviating from the presentation in FIG. 1, one can further proceed, if a current regulating loop for the primary current $I_1$ in the primary winding 11 is provided, by using as the second input voltage $cI_1$ the reference current value or the actual current value of this current regulating loop, which is available anyway.

To explain the determination of the proportionality constants $k$ and $c$ and of the operation of the protection arrangement, FIG. 2 will be considered in the following.

Figure 2:
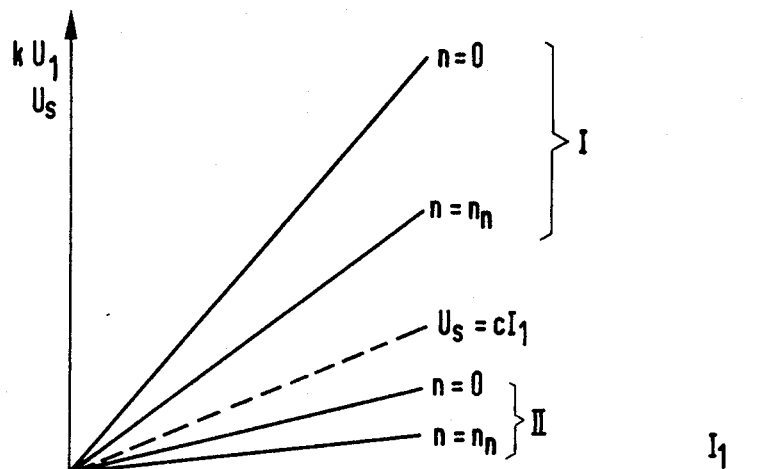
FIG. 2 is a voltage vs. current diagram for normal operation as well as for disturbed operation with the field winding short circuited.

In FIG. 2, four characteristics of the exciter machine 10 are shown as solid straight lines. The two upper characteristics relate to undisturbed, normal operation I at the speeds of rotation $n = 0$ and $n = n_n$, where $n_n$ signifies the nominal number of revolutions per minute. Intermediate speeds correspond to straight lines (not shown) between the two extreme characteristics. The two lower solid characteristics relate to the disturbed operation II, when the field winding 6 is short circuited. In each case, the dependence of the primary voltage $U_1$ on the primary current $I_1$ is shown, the primary voltage $U_1$ being further multiplied by the proportionality constant $k_1 < 1$. It is evident from FIG. 2 that there is a major distance between the characteristics in normal operation I and the characteristics for the disturbed operation II. Through a suitable choice of the proportionality constants $k$ and $c$, the protection characteristic $U_s = cI_1$ drawn as a dashed line, must lie in this intermediate region.

From consideration of the two upper and the two lower characteristics, it is found that the input impedance of the exciter machine 10 with the field winding 6 short circuited (disturbed operation), when the protection arrangement has responded, is substantially smaller than in normal operation I. Therefore, the primary voltage $U_1$ and the primary current $I_1$ provide unequivocal information on whether there is normal operation I or disturbed operation II. If the synchronous machine 5 is operated with constant field current by way of the control element 12 fed by a current regulator loop (then, also the primary current $I_1$ is approximately constant), then the primary voltage $U_1$ alone already furnishes an unequivocal criterion as to whether or not the protection arrangement including elements 16 and 17 has responded to an overvoltage in the rotating part 15 of the synchronous machine 5. This is no longer the case, however, if the primary current $I_1$ is varied over a fairly wide range, e.g., in dependence on the load. Then, the voltage ranges for the undisturbed, normal operation I and the disturbed operation II can overlap. For this reason, it is necessary to use not only the primary voltage $U_1$, but also the primary current $I_1$ in the protection arrangement.

It should be noted once more that the protection characteristic $U_s = cI_1$ can be set by the choice of the two proportionality constants $k$ and $c$ in such a way that it runs between the characteristics $kU_1 = f(I_1)$ for undisturbed, normal operation I and the disturbed operation II. The adjustment can be accomplished through the choice of suitable step down ratios, series resistors, numbers of turns or the like electrically or mechanically.

The design of the voltage comparison means 20 may be, for instance, such that it provides an indicating signal $z = 1$ if $kU_1 > cI_1$, i.e., if there is normal operation I, and that it delivers an indicating signal $z = 0$ if $kU_1 < cI_1$, i.e., if there is shorted operation II.

Figure 3:
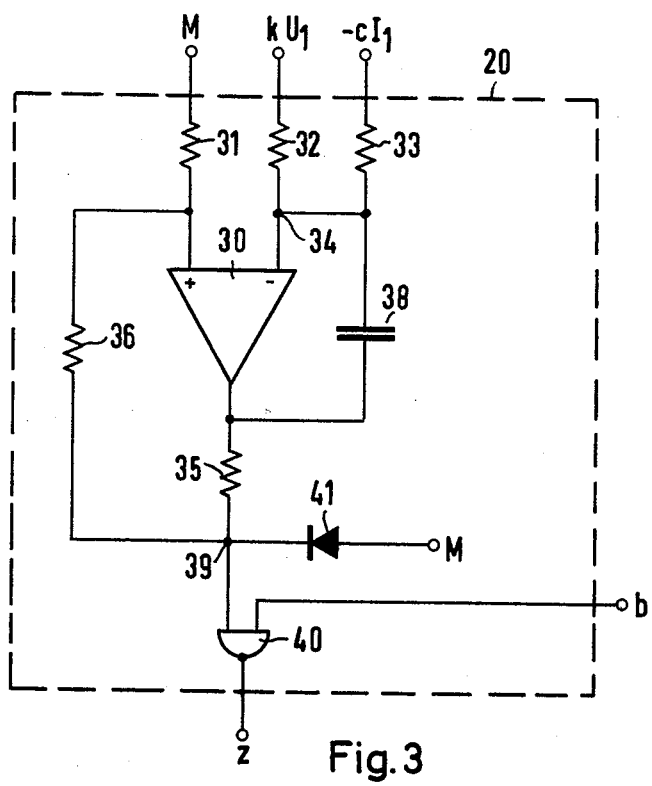
FIG. 3 is a schematic diagram of a voltage comparison member using an operational amplifier.

According to FIG. 3, the voltage comparison member 20 has been realized by means of an electronic amplifier connected as a limit indicator. In particular, an operational amplifier 30 as illustrated may be used. The positive input of the operational amplifier 30 is connected to ground M via a resistor 31. The first input voltage $kU_1$ is connected via a resistor 32 and the second input voltage $cI_1$ is connected to the negative input via a further resistor 33. The second input is negative with respect to ground M. The resistance values of the two resistors 32 and 33 are equal in the present case. In the general case, the magnitude of the proportionality constants $k$ and $c$ can be adjusted within certain limits by making them different. The negative input of the operational amplifier 30 is to be viewed as the comparison or summing point 34 for the two input voltages $kU_1$ and $cI_1$. Among the external components of the operational amplifier 30 are further an output resistor 35 and a feedback resistor 36.

Between the output of the operational amplifier 30 and the negative input 34 an integrating capacitor 38 may also be arranged. The addition of an integral component which is accomplished in this manner prevents false alarms from occurring during normal operation I in the event of short time changes of the two input voltage $kU_1$ or $cI_1$, for instance, during control maneuvers.

The interconnection of the components 30 to 38 shown has the property that a negative output signal appears at the output 39 if the input voltage $kU_1$ is larger than the input voltage $cI_1$, and that a positive output signal appears at the output 39 if $kU_1$ is smaller than $cI_1$.

To reverse the sign of this output signal, a NAND gate 40 may be provided. Its first input is connected to the output resistor 35. Since commercially available NAND gates work with positive voltages, a diode 41 is connected between the output 39 and ground M. The diode clamps the output 39 so that no negative voltages appear at the output 39. The second input of the NAND gate 40 is addressed by a cutoff signal $b$. By means of this cutoff signal, the indicating signal $z$ taken off at the output of the NAND gate can be cancelled.

Figure 4:
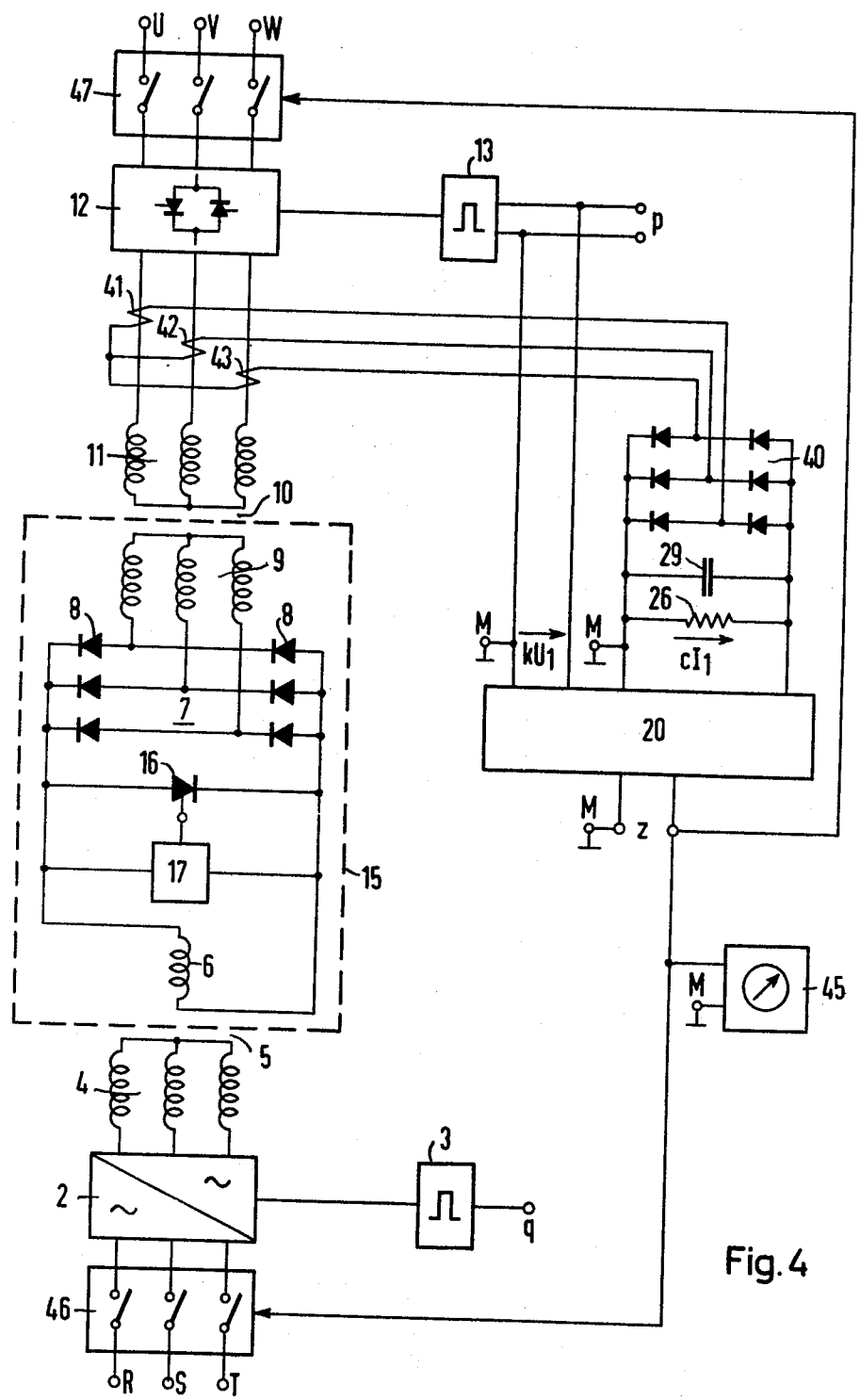
FIG. 4 is a schematic diagram of an alternate embodiment of the present invention.

In FIG. 4, a protection arrangement for a brushless synchronous machine 5 is shown which largely corresponds to that in FIG. 1. Thus, only the features which differ will be described in the following.

Contrary to FIG. 1, the first input voltage $kU_1$ is derived in FIG. 4 not by measurement at the output of the control element 12, but by tapping the input of the control unit 13. Thus, the control signal $p$ of the control element 12 is used as the first input voltage $kU_1$.

Contrary to FIG. 1 the second input voltage $cI_1$, is formed by a measuring device which comprises essentially a rectifier 40 with uncontrolled valves in a three phase bridge circuit, and three current transformers 41, 42 and 43. The current transformers 41, 42 and 43 are Y connected with their free leads brought to the three phase terminals of the rectifier 40. A current transformer 41, 42 or 43 is arranged in each lead to the primary winding 11. By using three current transformers 41, 42, 43 instead of a single current transformer, one obtains less ripple in the second input voltage $cI_1$.

It is also evident from FIG. 4 that the indicating signal can be used to indicate a disturbance and/or to switch off the armature current and/or for switching off the primary current of the exciter machine. To this end, the output signal is connected to an indicating device 45. At the same time it is also brought to a switching device which is in series with the frequency changer 2. Finally, the indicating signal $z$ is also fed to a further switching device 47, which is connected in series with the control element 12.

What is claimed is:

1. In a protection arrangement for protecting a brushless synchronous machine against overvoltages at a field winding which is connected to a rotating excitation rectifier fed from an exciter machine which includes a solid state switching element for short circuiting the field winding if overvoltages occur, the improvement comprising:
   a. means for forming a first input voltage proportional, by a first proportionality constant, to the primary voltage of the exciter machine;
   b. means for forming a second input voltage proportional, by a second proportionality constant, to the primary current of the exciter machine, the two proportionality constants being chosen so that the absolute value of the second input voltage in normal operation of the synchronous machine is lower and, if the field winding is short circuited, is higher than the first input voltage; and
   c. voltage comparison means having said first and second voltages as input and providing at its output an indicating signal.

2. The improvement according to claim 1, wherein said means for forming said first input voltage for said voltage comparison means comprise a transformer having its primary connected the primary winding of the exciter machine and having step down ratio which essentially fixes said first proportionality constant, and a first rectifier connected to the secondary of said transformer.

3. The improvement according to claim 1 wherein said synchronous machine further includes a control element which can be controlled by a control signal and which feeds the primary winding of the exciter machine and wherein said means for forming said first input signal comprise means to couple the control signal of the control element to said voltage comparison means.

4. The improvement according to claim 3, wherein said means for forming said second input voltage for said voltage comparison means comprise a current transformer which is connected in series with the primary winding of the exciter machine and the number of turns of which essentially determines the second proportionality constant, and a second rectifier coupled to the output of said current transformer.

5. The improvement according to claim 4 wherein said exciter machine has a three phase primary winding and wherein said means for forming said second input voltage comprise three current transformers, one arranged in each lead to the primary winding, and a rectifier with valves in a three phase bridge circuit, coupled to the outputs of said current transformers.

6. The improvement according to claim 1, wherein said means for forming said second input voltage for said voltage comparison means comprise a current transformer which is connected in series with the primary winding of the exciter machine and the number of turns of which essentially determines the second proportionality constant, and a second rectifier coupled to the output of said current transformer.

7. The improvement according to claim 2, wherein said means for forming said second input voltage for said voltage comparison means comprise a current transformer which is connected in series with the primary winding of the exciter machine and the number of turns of which essentially determines the second proportionality constant, and a second rectifier coupled to the output of said current transformer.

8. The improvement according to claim 1 wherein said synchronous machine includes a control element which feeds the primary winding of the exciter machine and can be controlled by a control signal which in turn is supplied by a current regulator, into the comparator of which an actual current value and a reference current value are set, and wherein said means for forming said second input voltage comprise means to couple the actual current value of the current regulator to said voltage comparison means.

9. The improvement according to claim 1 where said voltage comparison member comprise an operational amplifier.

10. The improvement according to claim 9 and further including an integrating capacitor associated with said operational amplifier.

11. The improvement according to claim 9, and further including a NAND gate coupled to the output of said operational amplifier.

12. The improvement according to claim 1 and further including an indicating device or a switching device for switching off the armature current of the synchronous machine or the primary current of the exciter machine coupled to the output of said voltage comparison means.

* * * * *